Figure 1:
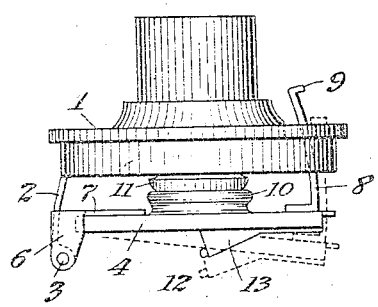

No. 855,828. PATENTED JUNE 4, 1907.
E. L. AIKEN.
PHONOGRAPH RECORDER AND REPRODUCER.
APPLICATION FILED FEB. 5, 1906.

Witnesses:
Frank W. Lewis
Delos Holden

Inventor:
Edward L. Aiken
by Frank L. Dyer
Atty.

UNITED STATES PATENT OFFICE.

EDWARD L. AIKEN, OF EAST ORANGE, NEW JERSEY, ASSIGNOR TO NEW JERSEY PATENT COMPANY, OF WEST ORANGE, NEW JERSEY, A CORPORATION OF NEW JERSEY.

PHONOGRAPH RECORDER AND REPRODUCER.

No. 855,823.   Specification of Letters Patent.   Patented June 4, 1907.

Application filed February 5, 1906. Serial No. 299,483.

*To all whom it may concern:*

Be it known that I, EDWARD L. AIKEN, a citizen of the United States, and a resident of East Orange, in the county of Essex and State of New Jersey, have invented certain new and useful Improvements in Phonographic Recorders and Reproducers, of which the following is a description.

My invention relates to phonographic recorders and reproducers, and more particularly to that type in which the recording or reproducing stylus is carried by a floating weight, as first disclosed in Edison Patent No. 430,278, dated June 17, 1890. In the use of a recorder or reproducer of this type with an Edison phonograph, the body is rigidly held in a traveling carrier arm which is sleeved at its rear on a fixed rod and is supported at its forward end upon a horizontal guide or straight edge, the parts being so arranged that the stylus will assume an operative position upon the surface of the record or blank when the body is properly placed in the carrier arm. The record or blank used with such an instrument is in the form of a hollow cylinder which is carried on a rotating mandrel and is of such diameter that the stylus will rest thereon and support the floating weight, as is well known. In using blanks of this character, where the record is only desired for use a short time, it is the practice to shave the record by means of a suitable shaving knife thereby forming a smooth cylindrical surface suitable for the formation of another record, so that the same blank may be used again and again. Each shaving operation, of course, reduces the radius of the blank a distance which is equal at least to the depth of the record groove, and it has been customary to use in this manner blanks, the radius of which varies as much as nine sixty-fourths of an inch. Since the floating weight must be supported by the surface of the blank and since the body of the recorder or reproducer occupies a fixed position with respect to the axis of the mandrel, it is obvious that the floating weight must turn upon its pivotal support in order to permit the stylus to operate upon blanks or records of different size. This movement of the floating weight being pivotal, it is obvious that the angle which the cutting stylus makes with the record surface at the point of contact will vary with different positions of the weight. It is undesirable, however, that this angle should vary greatly because the cutting operation requires that the stylus be held at a definite angle with respect to the record surface in order to produce the best results, and this angle can not be varied much without detracting from the quality of the record. Reproducing styluses are also frequently designed to operate only at or very close to a given angle, and are usually held by a lever whose angle can not vary much.

My invention has for its object the production of a floating weight recorder or reproducer in which the weight will have a large range of adjustment so as to be capable of operating upon blanks of widely varying diameter and in which the arrangement of parts will be such that the variation of the angle between the stylus and the record surface at the point of contact will be a minimum.

With these ends in view, my invention consists in the features hereinafter described and claimed.

Reference is hereby made to the accompanying drawing in which

Figure 3:
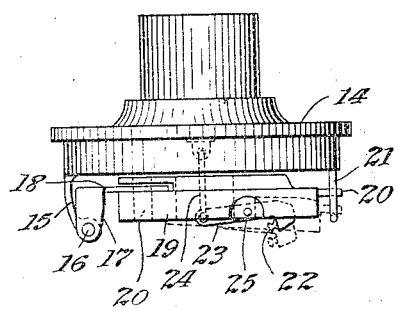
Figure 2:
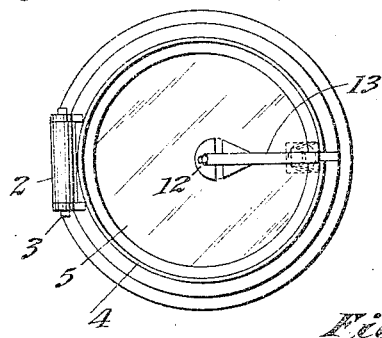
Figure 4:
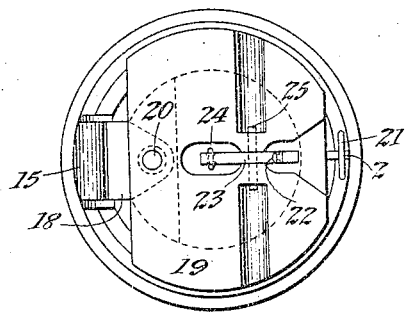
Figure 5:
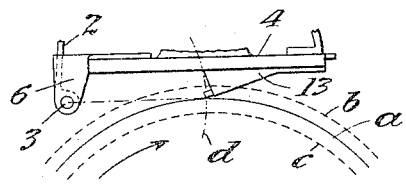

Figures 1 and 2 are a side elevation and bottom plan view respectively of a phonographic recorder embodying my invention. Figs. 3 and 4 are similar views of a phonographic reproducer. Fig. 5 is a diagrammatic view illustrating the positions assumed by the stylus when operating upon blanks of different diameters.

Like parts are designated by the same reference numerals in the several views.

Referring to Figs. 1 and 2, the recorder shown comprises the usual circular body 1 adapted to be secured in the carrier arm of a phonograph. Depending from the body 1 is an arm or plate 2 the lower end of which is provided with a pivot pin 3. The weight 4 which carries the diaphragm 5 is provided with downwardly extending ears 6 which may be integral therewith or formed in a pivot plate 7 secured thereto as shown. These ears are journaled upon the pin 3, so that the weight is capable of turning freely on said pivot to assume various positions, one of which is indicated by dotted lines in the drawing. Secured to the upper surface of the weight 4 is an arm 8 which passes through an opening in the body 1 and is bent over as shown at 9 to form a stop for limiting the downward movement of said weight. This weight is provided with the usual rounded bearing 10 which receives the lower end of the movable tube 11. The recording stylus 12 is held in a suitable holder 13 which is secured to the diaphragm in any suitable manner. In Fig. 1 the weight 4 is shown in a medial position, that is, it may occupy positions either above or below the position shown. The arrangement is such that this position will be assumed by the weight when the stylus is operating upon a blank of medium thickness, as illustrated in Fig. 5. In this view the line $a$ represents the surface of the blank which is being operated upon, while the dotted line $b$ represents a blank of greater diameter and the line $c$ one of less diameter. It will be observed that the axis of the pivot pin 3 is situated in a plane which is tangent to the surface of the blank $a$ at the point of contact of the cutting stylus, and that as the weight turns on said axis so as to bring the stylus into operative position upon the blanks $b$ and $c$ the cutting edge of the stylus moves along the arc $d$. Since the center of this arc lies between planes tangent to the surfaces $b$ and $c$ at the points to be operated upon, the angle made by the cutting stylus upon said blanks will be more nearly uniform than if said axis were either above the plan tangent to the blank $b$ or below the blank tangent to the blank $c$, in other words, its variation is a minimum.

The reproducer illustrated in Figs. 3 and 4 comprises a body 14 adapted to be secured in the carrier arm of the phonograph and provided with a diaphragm supported in the usual manner. The plate 15 depends from said body and carries a pivot pin 16 upon which are journaled depending ears 17 of the pivot plate 18. A weight 19 is provided with a vertical pin 20 which passes through an opening in the plate 18 whereby the parts 18 and 19 are pivotally secured together, and the weight 19 is capable of universal movement on horizontal and vertical axes. A pin 20 projects from the forward end of the weight into a loop 21 depending from the body 14 and thereby limits the vertical movement of the weight 19 in a downward direction. The reproducing stylus 22 is carried by the usual lever 23 which is pivoted at 25 to the weight 19 and is connected at one end to the diaphragm by the link 24. The various parts are so proportioned that when the stylus is operating upon a blank of medium diameter the axis of the pin 16 will occupy a plane tangent to the surface of the blank at the point of contact of the stylus and hence will be between planes tangent to blanks of maximum and minimum diameter.

Having now described my invention, what I claim as new and desire to secure by Letters Patent is as follows:—

1. In a device of the character described, the combination of a body, a weight pivoted thereto on a horizontal axis, and a stylus carried by said weight, said axis lying between planes tangential to the record surface at the points of contact of the stylus in its extreme operative positions, substantially as set forth.

2. In a device of the character described, the combination of a body, a weight pivoted thereto on a horizontal axis and a stylus carried by said weight, said horizontal axis lying in a plane tangential to the record surface at the point of contact of the stylus when occupying a medial position, substantially as set forth.

3. In a device of the character described, the combination of a body, a plate or disk pivoted thereto on a horizontal axis and a stylus carried by said plate, the said horizontal axis being below the plane of the weight when the latter is in its highest operative position, substantially as set forth.

4. In a device of the character described, the combination of a body and a stylus carrying plate or disk pivoted thereto on a horizontal axis situated below the plane of the weight, substantially as set forth.

5. In a device of the character described, the combination of a body, a pivot plate pivoted to said body on a horizontal axis situated below the plane of the pivot plate, a weight pivoted to said pivot plate on a vertical axis and a stylus carried by said weight, substantially as set forth.

6. In a device of the character described, the combination of a body, a diaphragm carried thereby, a pivot plate pivoted to said body on a horizontal axis situated below the plane of the pivot plate, a weight pivoted to said pivot plate on a vertical axis, a stylus lever pivoted to said weight and connected to said diaphragm and a stylus carried by said lever, substantially as set forth.

This specification signed and witnessed this 2nd day of February 1906.

EDWARD L. AIKEN.

Witnesses:
DELOS HOLDEN,
FRANK D. LEWIS.